United States Patent [19]
Knipp et al.

[11] Patent Number: 4,893,434
[45] Date of Patent: Jan. 16, 1990

[54] PEST EXTERMINATING SYSTEM

[76] Inventors: Richard C. Knipp, 985 Papaya La., Winter Springs, Fla. 32708; Richard R. Schmitt, 292 Wekiva Park Dr., Sanford, Fla. 32771; Kenneth R. Chitwood, 115 Seminola Blvd., Casselberry, Fla. 32707

[21] Appl. No.: 352,282

[22] Filed: May 15, 1989

[51] Int. Cl.$^4$ .............................................. A01M 7/00
[52] U.S. Cl. ..................................................... 43/124
[58] Field of Search ................. 43/124, 132.1; 52/101, 52/173, 220, 517; 169/9, 16; 239/200, 208, 209

[56] References Cited

U.S. PATENT DOCUMENTS

| | | | |
|---|---|---|---|
| 3,676,949 | 7/1972 | Ramsey | 43/124 |
| 3,782,026 | 1/1974 | Bridges et al. | 43/124 |
| 4,000,850 | 1/1977 | Diggs | 52/173 R |
| 4,028,841 | 6/1977 | Lundwall | 43/124 |
| 4,742,641 | 5/1988 | Cretti | 43/124 |

*Primary Examiner*—M. Jordan
*Attorney, Agent, or Firm*—William M. Hobby, III

[57] ABSTRACT

A gas or liquid distribution system in a building for pest control in the building has a plurality of flexible tubes in the walls of the building. Each tube has a plurality of openings unevenly spaced along the side thereof along one end portion of the tube. Each tube passes through a predetermined zone in the building and has a portion without any openings extending back to a control distribution box attached to the side of the building. A panel inside the control distribution box has a plurality of openings passing therethrough and has the open end of each flexible tube attached through an opening in the panel using a special pipe end connector for connecting the tube to the panel. The pipe end connectors are color coded to indicate the amount of pesticide liquid needed to be distributed to the building zone for the particular tube. In addition, the panel has a coding system to indicate which pipe inlet is for which building zone. The control distribution box may be mounted to the side wall of the building with all the tubes passing through a pipe into the building attic with each tube passing through the wall header into a section of the building wall.

11 Claims, 2 Drawing Sheets

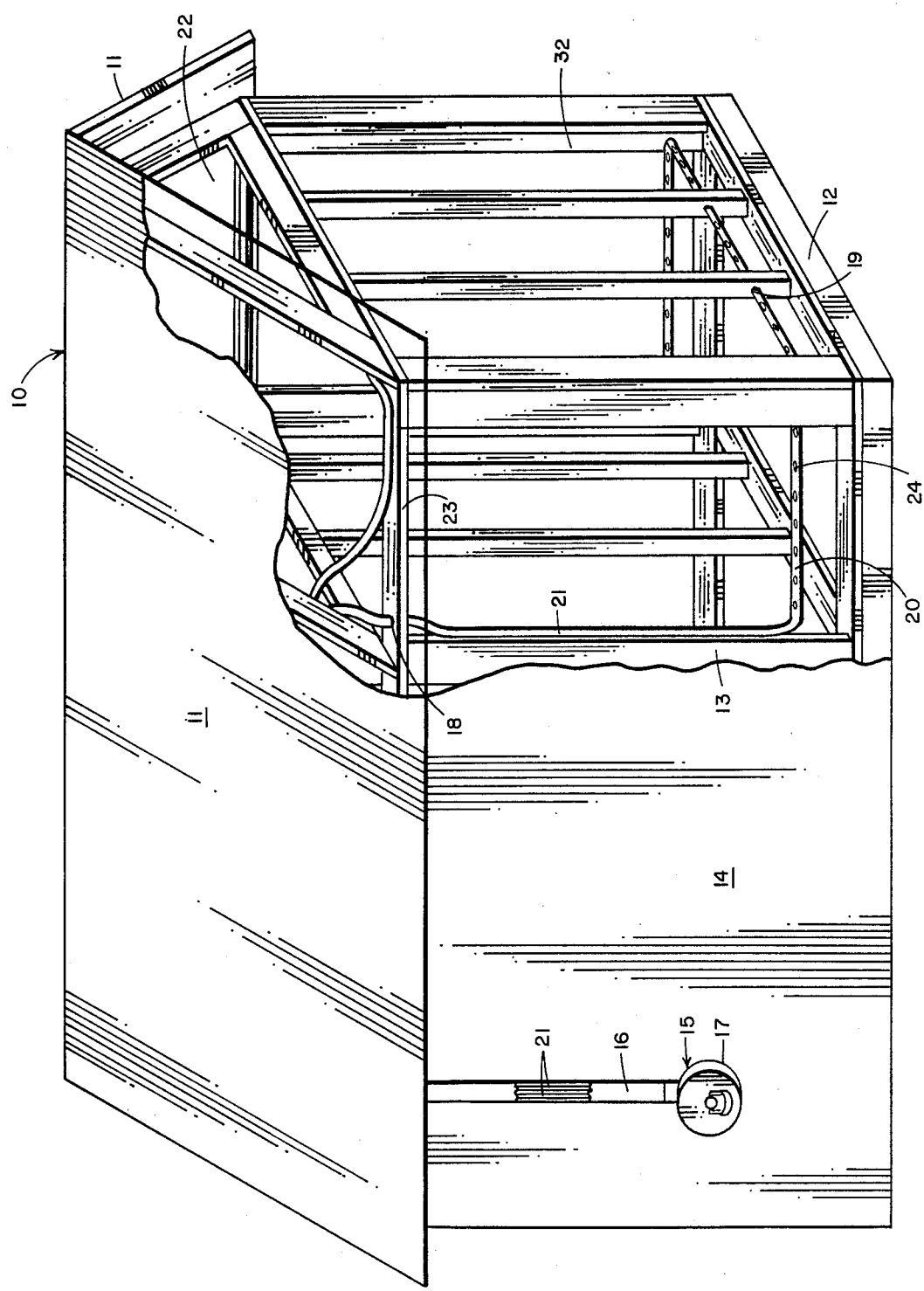

PEST EXTERMINATING SYSTEM

BACKGROUND OF THE INVENTION

The present invention relates to a gas or liquid distribution system for buildings and especially to a distribution system for controlling pests in the building and in the building walls.

The elimination of roaches, ants and other such pests can be a frustrating and expensive experience for the average building owner. Such pests initially enter a building from the outside through cracks in the walls of the building. They can be checked quite effectively if discovered in time. However, in the more normal situation, a building owner will usually ignore such pests until it is too late to eliminate them easily. By the time the building owner begins to take any corrective action these pests have begun breeding within the building, and it is difficult to eliminate them without great expense.

Roaches and other such pests usually breed within the walls of a building, behind and under cabinets and other similar inaccessible locations. They emerge from these breeding places from small spaces along the baseboard of the walls, and through spaces between cabinets, floors and walls.

In the past, a professional exterminating service has been the most effective method of dealing with such a pest problem. For such a service to be effective, however, periodic service calls are required so that a pesticide can be sprayed in various locations on the premises where the pests breed. Even these services are unable to get into the walls of the building where the pests breed. Therefore, most building owners usually try to eliminate such pests by using one of the many different brands of spray insecticides, which are available in retail stores. These commercially available insecticides are usually packages in aerosol cans permitting an atomized mist to be directed in a desired direction and location.

Most of the time, these aerosol insecticide sprays are applied directly on a single pest by the user, and thus are ineffective in eliminating the problem of breeding pests. Occasionally, a home owner will try to control the growth of the pest population by using these spray type insecticides by spraying the insecticide along the baseboard of the room and the cabinets and other likely pest breeding areas. It has been found that this is also an ineffective method of eliminating the pest problem because the atomized sprays will not penetrate into the spaces between the walls where most of these pests breed. Furthermore, the residual effect of these spray type insecticides is short lived, and the added burden of repeated applications will be required.

There are several presently known systems for exterminating pests by placing pipes in the walls of buildings and then injecting an insecticide through the pipes into the walls of the building or into the foundation for the control of termites. Prior U.S. patents include U.S. Pat. No. 3,602,248 for a termite control system in which pipes are laid out along the foundation and have connections for attaching pumps for pumping insecticides into the foundation. In U.S. Pat. No. 3,209,485, a built-in insecticide distribution system is also embedded into the foundation with a plurality of pipes. In the Ramsey patent, No. 3,676,949, an insecticide distribution system extends pipes through the walls passing through one stud and then the next with a distribution nozzle located between each set of studs so that insecticides can be pumped into the walls of the building. The Meyer et al. patent, No. 3,513,586, is a vermin proof building foundation in which pipes having a plurality of holes therein mounted in the building foundation. In the Griffin patent, No. 2,915,848, a built-in insecticide distribution system distributes the insecticide both in the foundation and through the walls of the building. In the Gaines, Jr. patent, No. 3,550,319, an apparatus and method for injecting purified gas to plant roots has a set of tubing in the bottom of a planter.

In the U.S. Pat. to Bridges et al., No. 3,782,026, a pest exterminating apparatus passes pipes through home walls or, alternatively, beneath the base molding where the insecticide gas can be injected into the wall. In the Lundwall patent, No. 4,028,841, a distribution system for vermin control composition mounts the insecticide storage and pressurizing system in the attic and directs the pest control fluid into the walls of the building through openings in a pipe.

In U.S. Pat. No. 4,742,641 to Cretti, a permanently installed pest extermination system is mounted in the walls passing through the studs and, alternatively, may be mounted beneath the base molding for distributing pest extermination fluid throughout the building walls. This system has a built-in reservoir and storage system built into the wall for distribution of the liquid whenever the pump is turned on and may be operated with a timer to inject the insecticide in predetermined amounts at predetermined spaced intervals. The Carter patent No. 3,330,062 is another insect control system having pipes in the inner walls. At least one commercial system is being distributed which system as set forth in a brochure has a plurality of pipes passing through the walls with the pipes terminating in a plurality of electrical boxes mounted in the wall where a conventional pesticide is injected into the walls of the building.

The present invention has a plurality of tubes, each feeding into to a different zone of the building and each terminating at the other end in a single injection panel box. Each of the tubes is a solid tube leading to the particular zone to be injected with insecticide at which point the tube has a plurality of openings to allow the escape of the insecticide gas or liquid. The openings in the tube are spaced at varying distances apart in order to compensate for the loss of pressure as the insecticide passes the first opening in order to provide a more even distribution throughout the tube length. A single distribution box has all of the tubing passing through a single pipe into the building attic and then leading into the walls at predetermined points through the headers in the wall. The termination of the tubes in the distribution box are coded for the amount of fluid to inject and to indicate the particular zone that any particular tube is connected to.

SUMMARY OF THE INVENTION

The present invention relates to a gas distribution system in a building for the control of pests in the building and includes a plurality of flexible tubes, each tube having a plurality of openings in the side thereof in one end portion of the tube and having no openings in the other end portion of the tube. Each tube has one open end attached to a panel in a control distribution box. The control distribution box is attached to a building wall and has a panel therein with all of the tubes from throughout the building attached thereto and each flexible tube is attached to a control distribution box panel with a tube end connector which connects the tube end through an opening in the panel so as to allow injection of an insecticide thereinto. Each tube end connector is color coded for the amount of injection needed for any particular zone in the building and is marked to indicate the particular zone of the building that a tube leads to. The flexible tubes pass through an enlarged tube to the attic of the building and then are dropped into the walls at the desired zone. The openings in each tube are spaced so as to compensate for the loss of pressure from the first opening to the last so as to avoid uneven distribution of the fluid through the openings. The distribution box can also be such as to simultaneously distribute into all of the pipes at the same time or open to inject different amounts into each tube ending.

BRIEF DESCRIPTION OF THE DRAWINGS

Other objects, features, and advantages of the present invention will be apparent from the written description and the drawings in which:

FIG. 1 is a cutaway perspective view of a framed building having the present gas distribution system therein;

FIG. 2 is a side elevation of one end of the flexible tube showing the spacing of the openings in the tube;

DESCRIPTION OF THE PREFERRED EMBODIMENT

Figure 3:
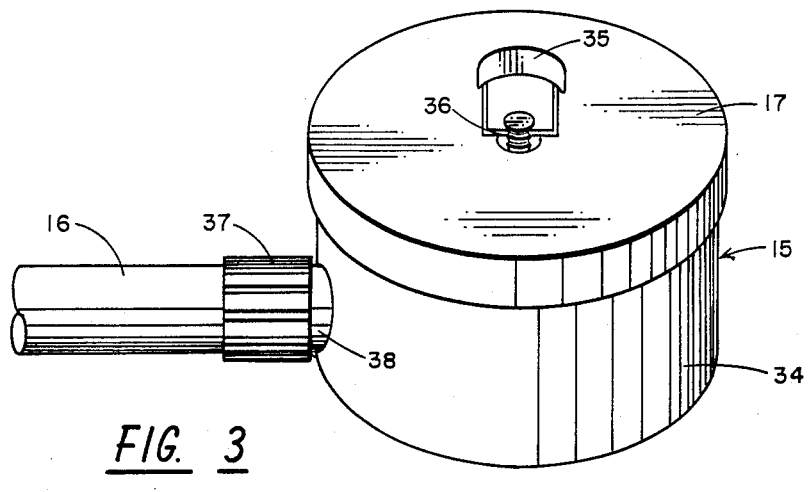
FIG. 3 is a perspective view of a distribution box for the system of the present invention.
Figure 4:
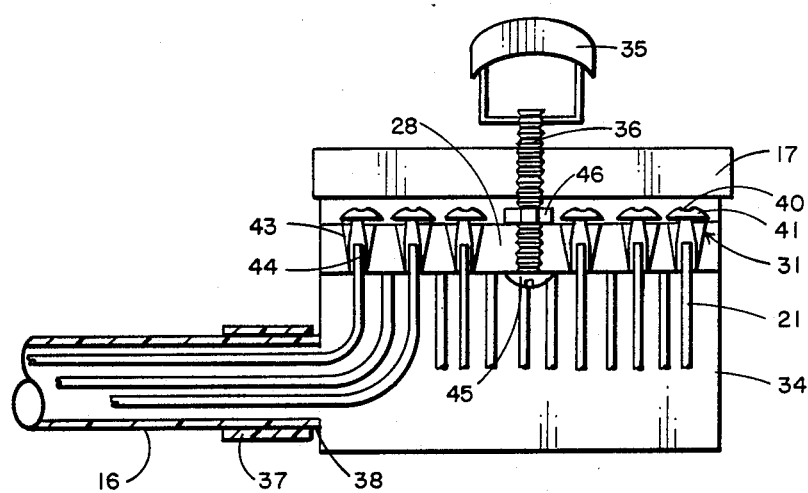
FIG. 4 is a sectional view taken through the distribution box of FIG. 3.
Figure 6:
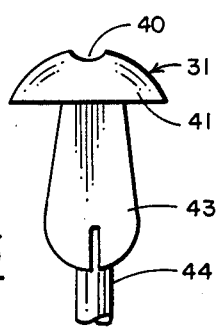
FIG. 6 is a side elevation of one tube connector.
Figure 7:
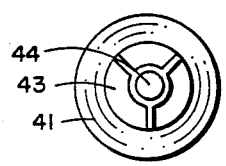
FIG. 7 is a bottom elevation of the connector of FIG. 6.

Referring to the drawings and especially to FIG. 1, a building 10 is shown having a roof 11 and a portion of the sides cut away to expose a foundation slab 12 and having a plurality of studs 13 behind the exterior walls 14. The building has a control distribution box 15 having a polymer pipe 16 extending from the top thereof to the roof 11 edge. The control distribution box 15 has a cover 17 thereover. A plurality of flexible polymer tubes 21 passes from the distribution box 15 through the polymer tube 16 and into the attic portion 22 of the building 10. The tubes then extend around the perimeter of the exterior walls of the building within the attic space 22. Each tube then passes through a small aperture 18 extending through the header 23 of the building and each tube 20 passes into the space between a pair of building studs 13. A portion of the tube 20 extending into the inside of the walls of the building 10 has a plurality of openings 24 while the tube portions 21 are solid tubes until they start the horizontal run in the bottom of the wall sections. The tube 20 then passes through openings 19 in studs 32 to cover a wall section as desired.

In FIG. 2, the openings 24 are shown closer together as they approach the end cap 25 of the tube 20 but are further away as they extend further away from the end 25. The spacing of the openings 24 compensates for a reduced pressure as the gas or liquid insecticide passes through the end 20, past the first opening 26, where the fluid starts expanding through the openings 26 and 24 reducing the pressure until the pressurized gas reaches the last opening 27 of the tube end 20.

Figure 5:
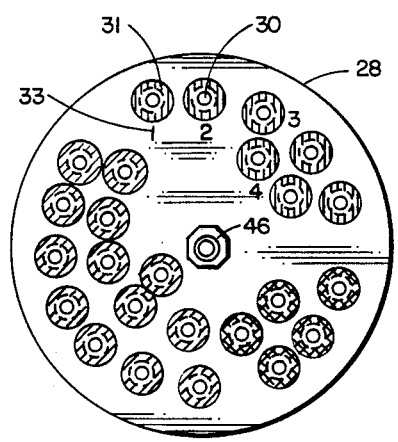
FIG. 5 is a front elevation of the distribution panel in the distribution box.

In operation as seen in FIGS. 1 through 4, the cap 17 can be removed from the control distribution box 15 to expose a distribution panel 28 as seen in FIG. 5 having a plurality of openings 30 which with the open ends of each of the tubes 21. Each of the open ends of the tube 30 are held by tube end connectors 31 attached to the distribution panel 28. The gaseous insecticide can be injected into the open ends 30 and each tube then directs the insecticide into one end 20 of the tubes 21 and out the openings 26, 24 and 27 in the walls of the building 10. The connectors 31 have different colors to identify the amount of insecticide required for distribution into any zone 32. A zone is the area covered by any one tube 20 normally passing through holes drilled into a plurality of studs 13 or firing strips to cover one wall or one room or one area of the building.

In FIG. 5, the panel 28 has a plurality of indicia 33 under each connector 31 to allow the connector in the distribution panel 28 to identify the particular zone 32 that flexible tube 21 extends into. The control distribution box 15 of FIG. 3 has a cylindrical polymer wall 34 with the cap 17 held thereon with a locking device 35 wired through an opening in a threaded rod 36 while the large tube 16 is attached with a coupling 37 to an opening tube 38 into the housing 15. Entrance into the distribution box 15 is by removing the locking device 35 from the threaded rod 36 and removing the cover 17. As seen in the sectional view of FIG. 4, each of the plurality of flexible tubes 21 are solid at this point and until they enter each of the particular spray zones within the building walls. Each tube is held by the fastener 31 having an opening 40 in the head thereof and a flanged head 41 which allows its insertion into a shaped opening 42 in the panel 28. The shaped opening then squeezes the split edges 43 of each connector 31 to squeeze it upon the tube end 44. This allows a connector 31 to be slipped into an opening 42 over the tube end 44 and snapped in place to hold the tube end. The connectors are color coded to indicate the amount of fluid insecticide to be injected into each tube 21 and to allow the snap fastening of the end of the tube 44 to the distribution panel 28 which has truncated conical shaped openings 42 passing therethrough. Threaded bolt 36 can have a head 45 thereon and a nut 46 for attaching it to the distribution panel plate 28.

In normal operation, the insecticide distribution system is installed in a building being built by passing the pipes 21 around the attic 22 through the headers 23 and down into each zone 32. Each flexible tube in the attic 22 passes through the tube 16 into the distribution box 15 and has the end thereof attached to the panel 28 with the appropriate color coded connector 31. Each tube end portion 20 has a plurality of nozzle openings 24, 26, and 27 and an end seal 25 with the openings spaced closer as they near the end of the tube to balance the pressure and distribution through the end of the tube into the particular zone of the building.

It should be clear at this point that a gas or liquid distribution system is provided for a building for the control of pests in the building and especially in the building walls, however, the distribution system can be extended into the foundation for controlling termites if desired and can distribute insecticide within the attic 22 of the building without departing from the spirit and scope of the invention. Accordingly, the present invention is not to be construed as limited to the forms shown which are to be considered illustrative rather than restrictive.

We claim:

1. A gas or liquid distribution system in a building for the control of pests in the building comprising:

tube means disposed in the walls of a building and having a plurality of flexible tubes, each tube having a plurality of openings along the side thereof in one open portion thereof and each tube passing into a predetermined building zone;

a control distribution box attached to a building wall and having a panel therein having a plurality of openings passing therethrough and having the open end of each said flexible tube attached to said panel through one said opening therein; and a plurality of tube end connectors for connecting each flexible tube end to said panel in said control distribution box, each said connector extending into one said panel opening and holding one said flexible tube open end thereto whereby injecting a pest control gas or liquid into an opening in said panel and tube open end will distribute gas or liquid to one zone of a building.

2. A gas or liquid distribution system in a building for the control of pests in the building in accordance with claim 1 in which each said pipe has an injection end and a distribution end and said injection end has solid walls and said distribution end has said plurality of openings therein.

3. A gas or liquid distribution system in a building for the control of pests in the building in accordance with claim 2 in which said plurality of openings in said distribution end of each said pipe are spaced closer together at the end of said pipe.

4. A gas or liquid distribution system in a building for the control of pests in the building in accordance with claim 3 in which said plurality of pipe end connectors are in a plurality of colors to thereby color code the input to each pipe.

5. A gas or liquid distribution system in a building for the control of pests in the building in accordance with claim 4 in which a pipe connects said distribution box with the attic of a building and said plurality of flexible pipes extend therethrough from said distribution box to said building attic.

6. A gas or liquid distribution system in a building for the control of pests in the building in accordance with claim 5 in which said distribution box panel has indicia adjacent to each of said plurality of pipe end connectors to indicate the location of the zone of each flexible pipe.

7. A gas or liquid distribution system in a building for the control of pests in the building in accordance with claim 6 in which said distribution box has a removable cover over said panel therein.

8. A gas or liquid distribution system in a building for the control of pests in the building in accordance with claim 7 in which each said flexible pipe has a sealed end in the end portion of said distribution end.

9. A gas or liquid distribution system in a building for the control of pests in the building in accordance with claim 8 in which distribution box is a cylindrical box mounted to the exterior wall of a building.

10. A gas or liquid distribution system in a building for the control of pests in the building in accordance with claim 9 in which each said pipe end connector fits into an opening in said distribution box panel and over a flexible pipe end and is compressed onto said flexible pipe end.

11. A gas or liquid distribution system in a building for the control of pests in the building in accordance with claim 10 in which each said flexible pipe extends into a building attic and through a building header into the building walls and through a plurality of building studs to cover a zone within the building.

* * * * *